United States Patent
Bennett (10) Patent No.: US 11,724,579 B2
(45) Date of Patent: Aug. 15, 2023

(54) INSERTABLE ROLL-UP DOOR FOR A VEHICLE

(71) Applicant: Assa Abloy Entrance Systems AB, Landskrona (SE)

(72) Inventor: Scott Bennett, Upper Sandusky, OH (US)

(73) Assignee: Assa Abloy Entrance Systems AB, Landskrona (SE)

( * ) Notice: Subject to any disclaimer, the term of this patent is extended or adjusted under 35 U.S.C. 154(b) by 64 days.

(21) Appl. No.: 17/074,430

(22) Filed: Oct. 19, 2020

(65) Prior Publication Data
US 2022/0118833 A1    Apr. 21, 2022

(51) Int. Cl.
*B60J 5/14* (2006.01)
*E06B 9/13* (2006.01)

(52) U.S. Cl.
CPC .............. *B60J 5/14* (2013.01); *E06B 9/13* (2013.01); *E05Y 2900/516* (2013.01); *E05Y 2900/531* (2013.01)

(58) Field of Classification Search
CPC ......... B60J 5/14; B60J 5/08; E05Y 2900/516; E05Y 2900/531; E05Y 2900/518; E06B 9/13; E06B 9/11; E06B 9/17; E06B 9/17061; E06B 2009/17069
See application file for complete search history.

(56) References Cited

U.S. PATENT DOCUMENTS

| | | | | |
|---|---|---|---|---|
| 4,930,563 A | * | 6/1990 | Finch | E06B 9/58 160/133 |
| 5,003,747 A | * | 4/1991 | Morton | E06B 3/44 52/656.5 |
| 6,302,179 B1 | * | 10/2001 | Miller | E06B 9/78 160/133 |
| 2017/0211314 A1 | * | 7/2017 | Raffi | E06B 9/04 |
| 2018/0313082 A1 | * | 11/2018 | Klein | B32B 3/08 |
| 2020/0071974 A1 | * | 3/2020 | Burns | E05B 63/0069 |
| 2021/0046809 A1 | * | 2/2021 | Ramsey | B60J 5/08 |

OTHER PUBLICATIONS

Dover Roller Shutter, Model N35 Door Installation Instructions, Doverrollershutters.com, Jan. 24, 2013, pp. 1-8.

* cited by examiner

*Primary Examiner* — Daniel P Cahn
*Assistant Examiner* — John W Hanes, Jr.
(74) *Attorney, Agent, or Firm* — Wissing Miller LLP (57) ABSTRACT

An insertable roll-up door for a vehicle is formed from a header, left and right guide members and, optionally, a bottom sill. These components are assembled at a first geographic location to form a dimensionally stable subassembly. A flexible door panel is connected with a roller and installed in the subassembly where ends of the roller are received at top portions of the guide members and supported to rotate about a roller axis to wind the door panel onto and off from the roller. Edges of the door panel are guided by the guide members to move vertically to open and close the door. The assembled door is shipped to a second location to be installed on a vehicle. At the second location, an opening is created in the vehicle sized to receive the door. The door is inserted in the opening and fixed to the vehicle with fasteners.

7 Claims, 10 Drawing Sheets

INSERTABLE ROLL-UP DOOR FOR A VEHICLE

BACKGROUND

Field

The present disclosure relates to roll-up doors for vehicles. In particular, the present disclosure relates to roll-up doors that are preassembled at a manufacturing facility to create a dimensionally stable assembly, shipped to a second geographic location, and installed onto a vehicle, such as a delivery truck.

Description of the Related Art

Vehicles, such as delivery trucks, typically include a roll-up door to open and close the cargo space of the truck. Such doors allow cargo to be moved easily into and out of the cargo space. For many applications, roll-up doors are advantageous over swinging doors because they do not require clearance for the door panel to swing outward away from the body of the vehicle.

Delivery vehicles are often customized to carry and deliver different kinds of goods and for allowing the goods to be accessed from different areas of the vehicle. For example, a single refrigerated truck may have one compartment held at a very low temperature, (e.g., below freezing) and another compartment at a climate-controlled storage temperature (e.g., to normal refrigerated temperature). This arrangement allows both perishable and frozen goods can be carried on the same truck. One such compartment may be adjacent to the rear of the cargo space. This compartment is accessed using a roll-up door, typically provided as a standard part of a delivery truck. To access the separate freezer compartment, another door may need to be provided, through the side of the vehicle. A user may wish to customize the vehicle by selecting the location and size of this separate door.

Known roll-up doors that are added to vehicles are typically provided to a customer or installation technician as separate components that need to be assembled on site when the door is installed. Because roll-up doors require parts to be aligned so that the door travels smoothly, the technician installing the door needs to carefully align the components and to secure the components tightly to the structure of the vehicle so that the alignment is maintained. This may require a high level of skill on the part of the technician. Also, because the assembled pieces that form the door need to be assembled where the vehicle is located, providing tooling to accurately align the door components as the door is assembled may be difficult.

Components of known doors that are assembled on-site are typically joined using fasteners. Fasteners may become loose because of vehicle vibration and the stress imposed by opening and closing the door. This may result in misalignment of the door components leading to excessive wear and difficulty in operating the door.

The components of known vehicle roll-up doors typically do not form a separate, stand-alone structure that is dimensionally stable. Typically, door components are fastened to the wall of the vehicle to provide a mechanical stable structure. Fasteners, such as screws or bolts are used to join the components with the vehicle walls. Vibration caused by operation of the vehicle may loosen the fasteners, allowing components to shift out of alignment.

Providing a more durable connection between the components, such as by welding, may be inconvenient or impossible where the components need to be assembled on the wall of the vehicle. Once the components are connected with the wall of a vehicle, welding may scorch the finish or other components of the vehicle.

Roll-up doors may include a counterbalance to allow the door panel to move up and down with a minimum of effort, despite the weight of the door panel. A torsion spring counterbalance may be provided as part of the roller holding the door panel. Components of such a counterbalance may be under considerable tension when components of the door are delivered to a customer site. There is a risk of injury if the tension stored in the counterbalance is accidently released. This may pose a hazard to inexperienced technicians.

Thus, there is a need for roll-up doors that can be conveniently added to vehicles, that allows the vehicle user to select the size and location of the door, and that allows the user to conveniently and easily install the door. There is also a need for customized vehicle doors that are reliable, that require minimum maintenance, and that can be installed and/or replaced at a reduced cost.

SUMMARY

The present disclosure relates to apparatuses and methods to address these and other difficulties.

According to one aspect of the disclosure, there is provided a roll-up door for a vehicle that is assembled at a first location, for example, a manufacturing facility. The assembled door is packaged and shipped to a second location, for example, a vehicle shop or a customer's facility. The assembled door is inserted into a hole of predetermined size and at a selected location on the vehicle and connected with the vehicle using fasteners.

According to another aspect, the components of the roll-up door are assembled at a manufacturing facility using tooling to assure that the door components are accurately aligned to allow smooth functioning of the door. This tooling may be arranged so that components are connected with one another by welding to create a durable connection that will stay in alignment despite vibration and stress applied to the door during use.

According to another aspect, the roll-up door includes seals to provide a weather-tight connection between the door and the wall of the vehicle where the door is installed. The seal may be a continuous strip around the perimeter of the door without gaps that might be created between door components assembled on-site.

According to one embodiment, there is provided an insertable door for a vehicle comprising a horizontal header and left and right vertical guide members. The header is connected with the left and right guide members so that the members are substantially parallel with one another and substantially perpendicular to the header. Door guide slots are provided along inside faces of the left and right members. Roller receivers are provided at the top portions of the left and right guide members. A roller is provided behind the header with left and right ends of the roller supported by the roller receivers. The receivers allow the roller to rotate about a roller axis. A flexible door panel is connected at its top end with the roller. Side edges of the panel are received in the guide slots. The roller includes a torsion spring counterbalance. The connection between the ends of the roller and roller receivers fixes a non-rotating portion of the counterbalance mechanism with respect to the left and right guide members to allow stored torsion to counterbalance the weight of the door panel. When the door panel is pulled downward along the slots, the panel unrolls from the roller, increasing the torsional tension in the counterbalance. When the door is raised along the slots, the torsion causes the roller to turn, wrapping the door panel around the roller.

According to another embodiment, a sill is provided at a lower end of the left and right guide members. The sill is perpendicular to the guide members. When the door panel is pulled downward in the slots, the bottom edge of the door panel contacts the sill, closing the door.

According to another embodiment, the header, left and right guide members, and the sill are assembled using a jig. The jig holds the components in alignment so that the side members are perpendicular to the header and the sill and parallel with one another. While these components are held in alignment, connections between the components are fixed using welds.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
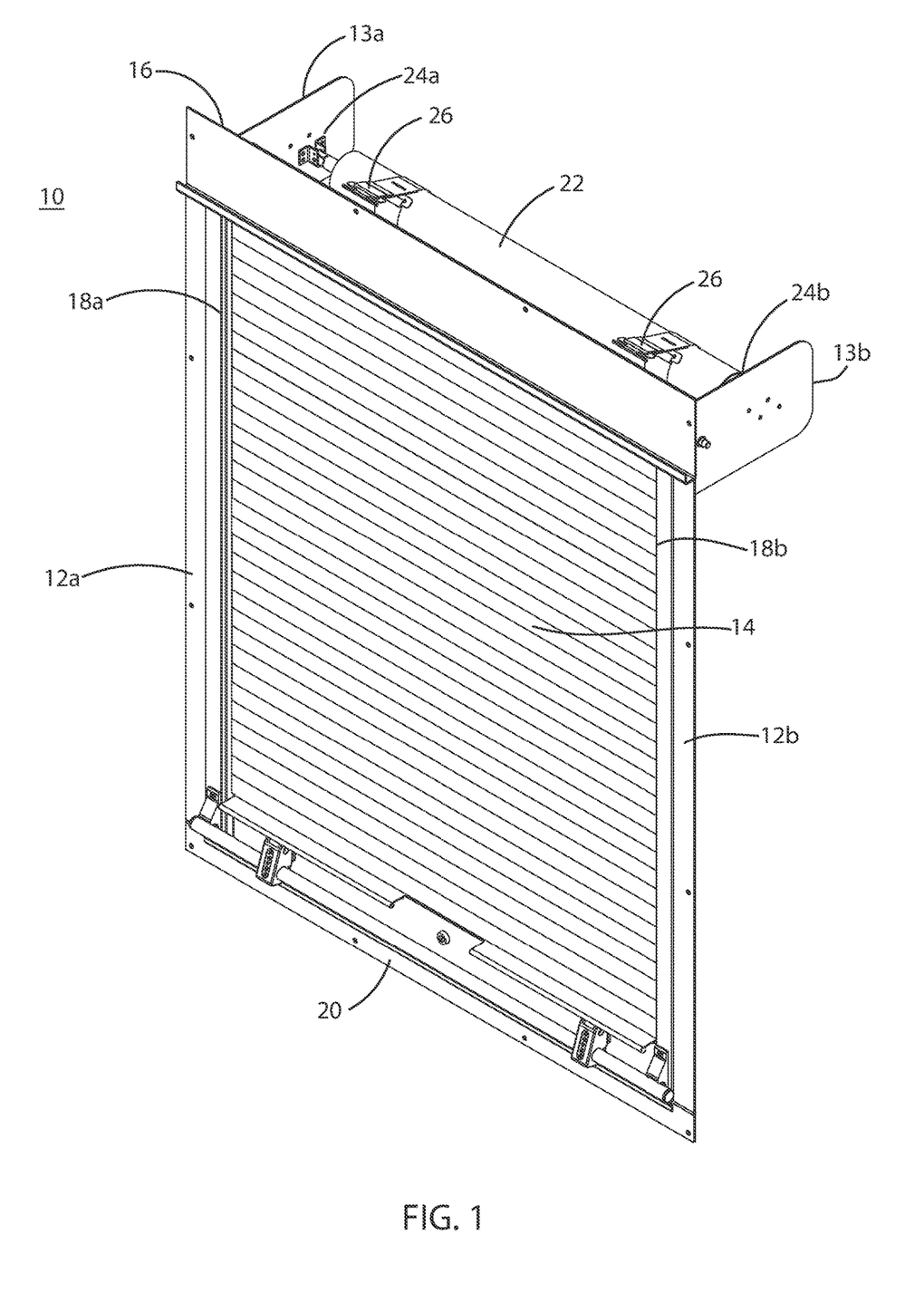
FIG. 1 is a perspective view of a roll-up door according to an embodiment of the disclosure.

FIG. 1 shows an insertable roll-up door 10 according to an embodiment of the disclosure. Left guide member 12a and right guide member 12b form the sides of door 10. A flexible door panel 14 is disposed between the members. Edges of door panel 14 are received in guide slots 18a and 18b connected along the opposing surfaces of left and right guide members 12a and 12b, respectively. Header panel 16 extends between the left and right guide members 12a, 12b along the top of the door.

According to some embodiments, a sill 20 is provided along the bottom of door 10. Sill 20 extends between the left and right guide members 12a, 12b along the bottom of the door. When the door panel 14 is pulled fully downward, the bottom edge of the door panel 14 contacts sill 20, closing the door. According to other embodiments, no sill is provided. Instead, door panel 14 contacts an edge of the door opening of the vehicle.

Figure 2A:
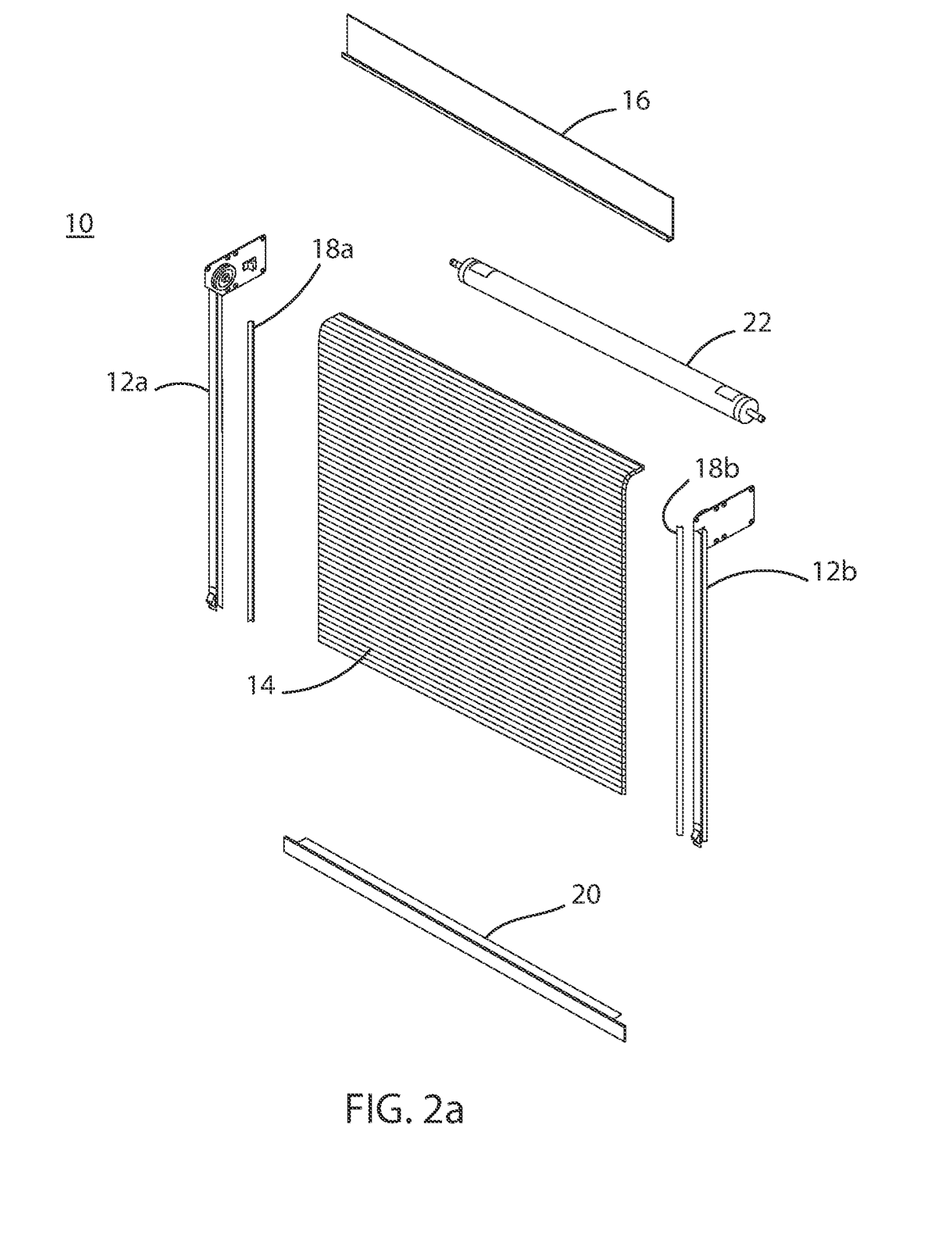
FIGS. 2a and 2b are exploded views of components of the door of FIG. 1.
Figure 2B:
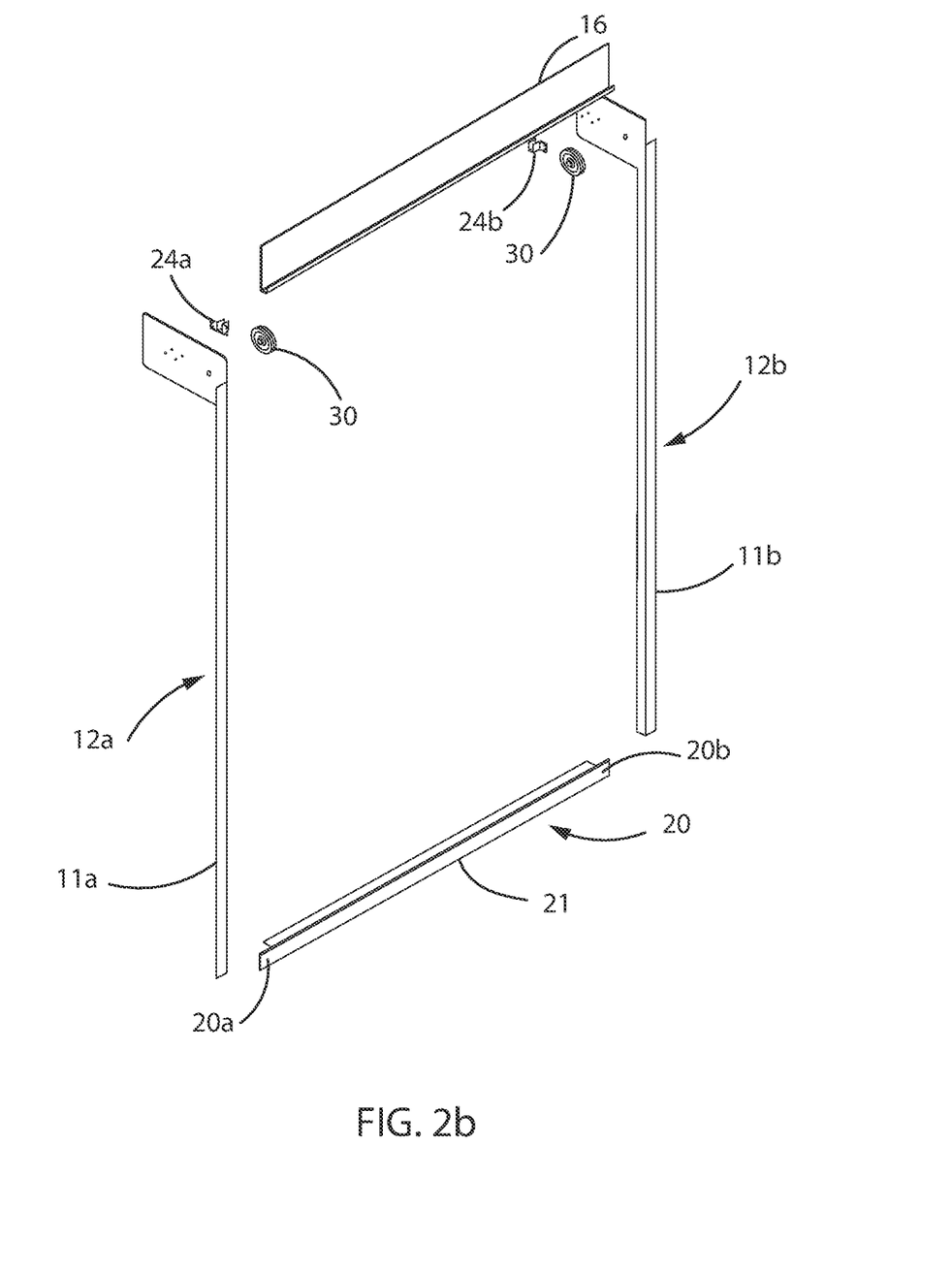

At the top of the left and right guide members 12a, 12b, positioned behind header 16, are left and right extensions 13a, 13b. These extensions include roller receivers 24a, 24b as can be seen in FIG. 2. In the view of FIG. 1, right receiver 24b is hidden by right extension 13b.

Roller 22 extends between receivers 24a, 24b in the space behind header 16. Connecting straps 26 connect the top edge of door panel 14 with roller 22. According to some embodiments, roller 22 includes a torsion spring counterbalance mechanism to offset the weight of the door panel 14. In the configuration shown in FIG. 1, the torsion spring mechanism is loaded so that when the door panel is lifted upward, torque provided by the torsion spring mechanism causes the roller 22 to turn clockwise, rolling the door panel 14 around roller 22 to assist in opening the door.

FIGS. 2a and 2b are exploded views of the components of door 10. As shown in FIG. 2a, door panel 14 is received in guide slots 18a, 18b. The guide slots are supported by vertical guide members 12a and 12b on the left and right sides of the door, respectively. Header 16 is provided along the top face of the door panel 14. In embodiments where one is provided, as sill 20 is provided along the bottom of the door panel 14. The top edge of the door panel 14 connects with roller 22, as will be explained more fully below.

Figure 3:
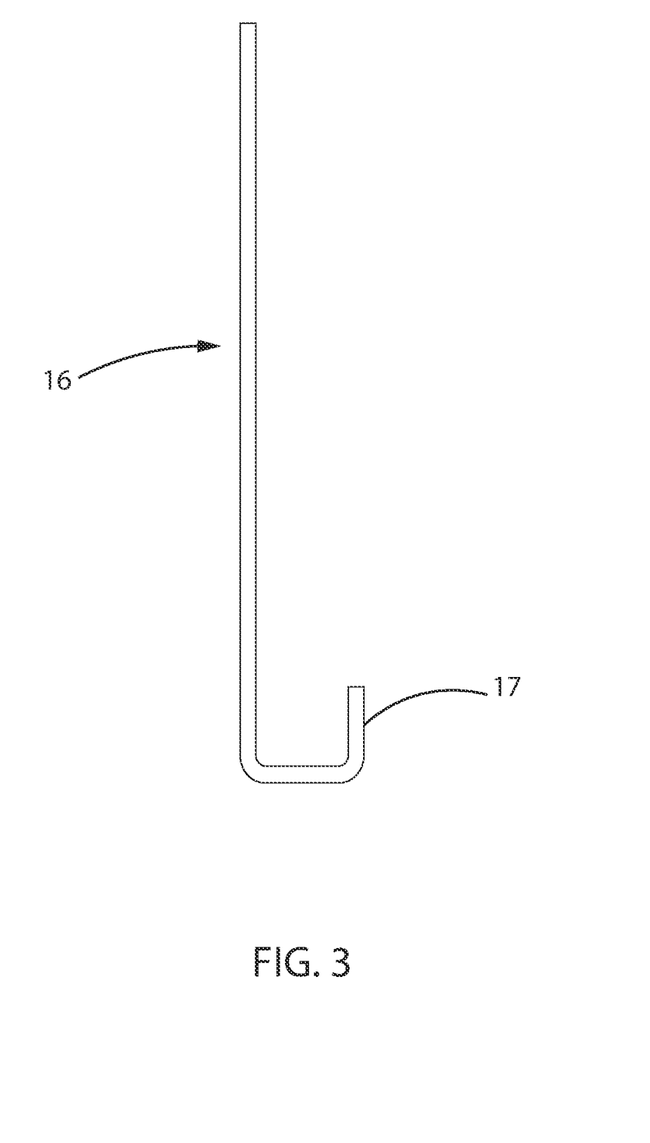
FIG. 3 is a cross-section view of a header component of the door of FIG. 1.

FIG. 2b shows the structural components of door 10 that will form the structural subassembly 10a. FIG. 3 is a cross section of header 16. As shown in FIGS. 2b and 3, header 16 is flat across the surface abutting the top portions of members 12a and 12b. Left and right guide members 12a, 12b include respective left flange 11a and right flange 11b extending leftward and rightward of the door 10. The front faces of flanges 11a, 11b are flat. The flat, back side of header 16 is in contact with the flat faces of flanges 11a, 11b near the tops of guide members 12a, 12b. According to some embodiments the components are jointed with one another using MIG welding, spot welding, or other welding techniques know to those of skill in the field of the invention.

As shown in FIG. 3, header 16 includes a rain gutter 17. When the door is assembled, the rain gutter 17 extends across the top of the opening closed by the door panel 14. Sill 20 includes rabbets 20a, 20b at each end. The rabbets lay flat against the face of members 12a, 12b at the bottom ends of the members. Rabbets 20a, 20b are connected with bottom ends of guide members 12a, 12b by welds. Sill 20 also may include a bottom flange 21 extending downward. A seal, such as an elastomeric foam may be provided on the back side of flanges 11a, 11b, header 16, and bottom flange 21.

Header 16, guide members 12a, 12b, and sill 20 can be sized to provide a door with customized dimensions. The parts may be formed from metal stampings, such as from aluminum, steel or other sheet metal. Blanks used to form the components may be stamped to a maximum length and shaped to form the cross-sectional shapes required for the door components. This technique may be used to form a stock supply of components. When a door 10 is to be created with a customized dimension, these stock components can be cut down to the correct size for the door selected door dimensions.

Figure 4A:
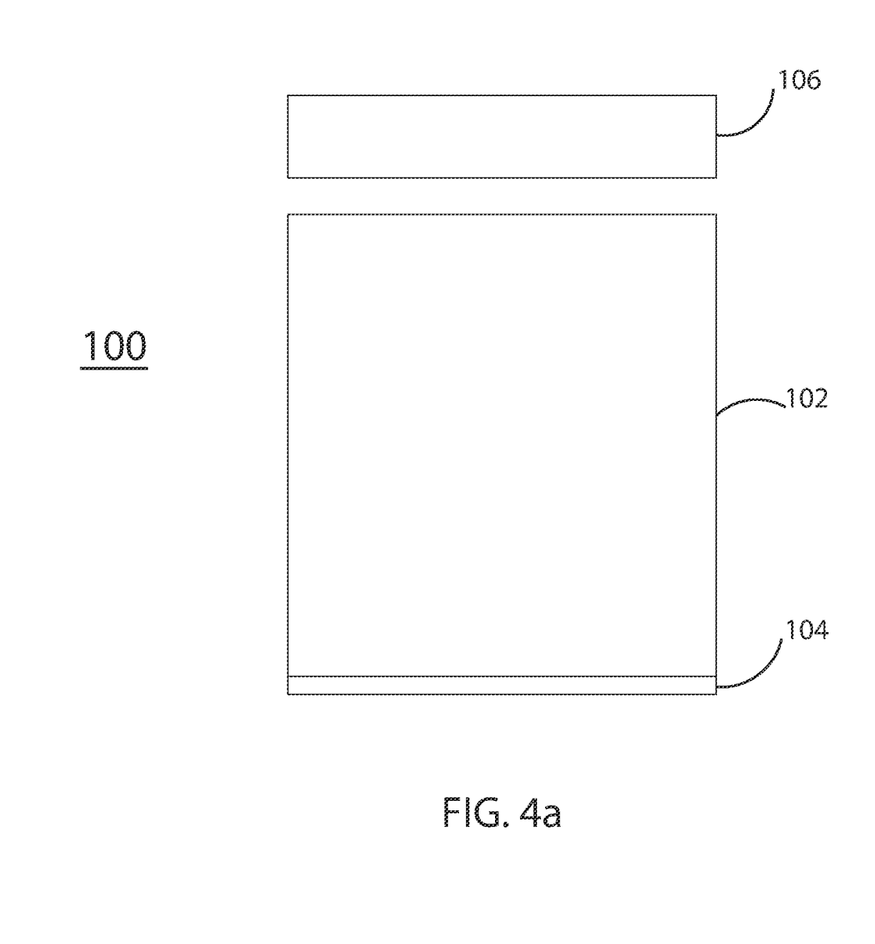
FIGS. 4a and 4b are a front view and a cross-section view, respectively, of a jig used to assemble the door of FIG. 1.
Figure 4B:
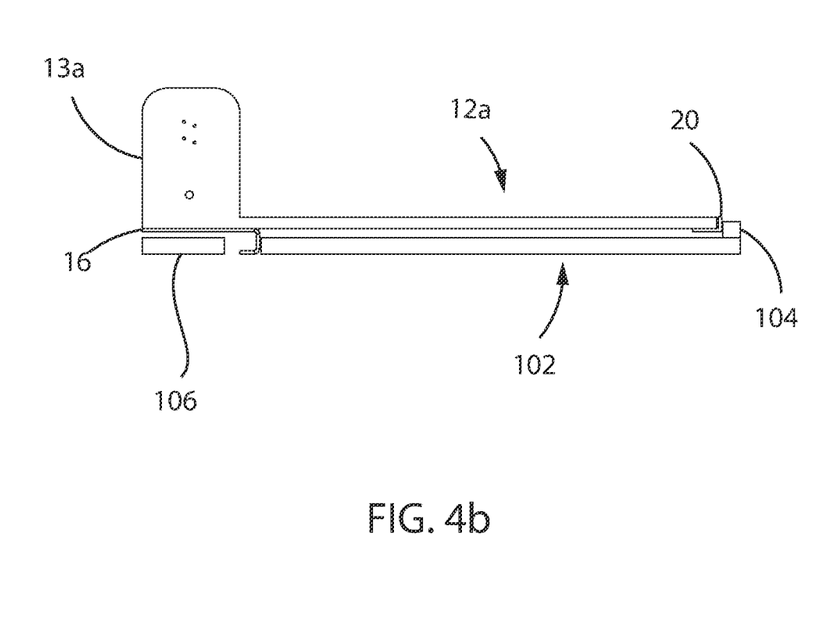

FIG. 4a is a front view of a jig used to assemble components of structural subassembly 10a according to an embodiment of the disclosure. FIG. 4b is a cross-section view of door components being assembled using jig 100. As shown in FIG. 4a, jig 100 is formed from a flat main support 102 sized to hold the maximum length of guides 12a, 12b, header 16, and sill 20. At the top of main support 102 is header support 106. The width of header support 106 is sufficient to support header 16. A movable sill guide 104 is provided across main support 102 parallel with header support 106.

FIG. 4b shows a cross section of components of door subassembly 10a positioned on jig 100. The jig 100 may be at a first geographic location such as a manufacturing facility equipped to assemble, align, and test doors. For purposes of illustration, the view of FIG. 4b is a cross-section though the left guide member 12a. The same configuration is provided for the right portion through right guide member 12b. Header 16 is positioned on header support 106 with rain gutter 17 positioned in the gap between header support 106 and main support 102. In embodiments where a sill will be provided, sill 20 is positioned against sill guide 104. The location of sill guide 104 is adjusted based on the selected height of door 10 and fixed to main support 102. The bottom end of left member 12a rests on top of the rabbet 20a of sill 20. Extension 13a of member 12a extends upward. The same arrangement is made on the opposite side of jig 100 between right side member 12b and header 16 and sill 20.

When components have been arranged on jig 100, they are positioned so that left and right members 12a, 12b are parallel with one another and so that they are perpendicular with header 16 and sill 20. The components are clamped to jig 100 and welds are created to join the components with one another. The clamps are removed and the assembled components are removed from the jig 100. According to one embodiment, once the arrangement of the components is confirmed, with guide members 12a, 12b parallel with one another and both perpendicular with header 16 and sill 20, joints between the components are tack welded with one another to create a stable structure. The assembled components are removed from jig 100 so that both sides of the subassembly 10a can be accessed and more substantial welds are made to assure the structural integrity of the assembly.

Figure 7:
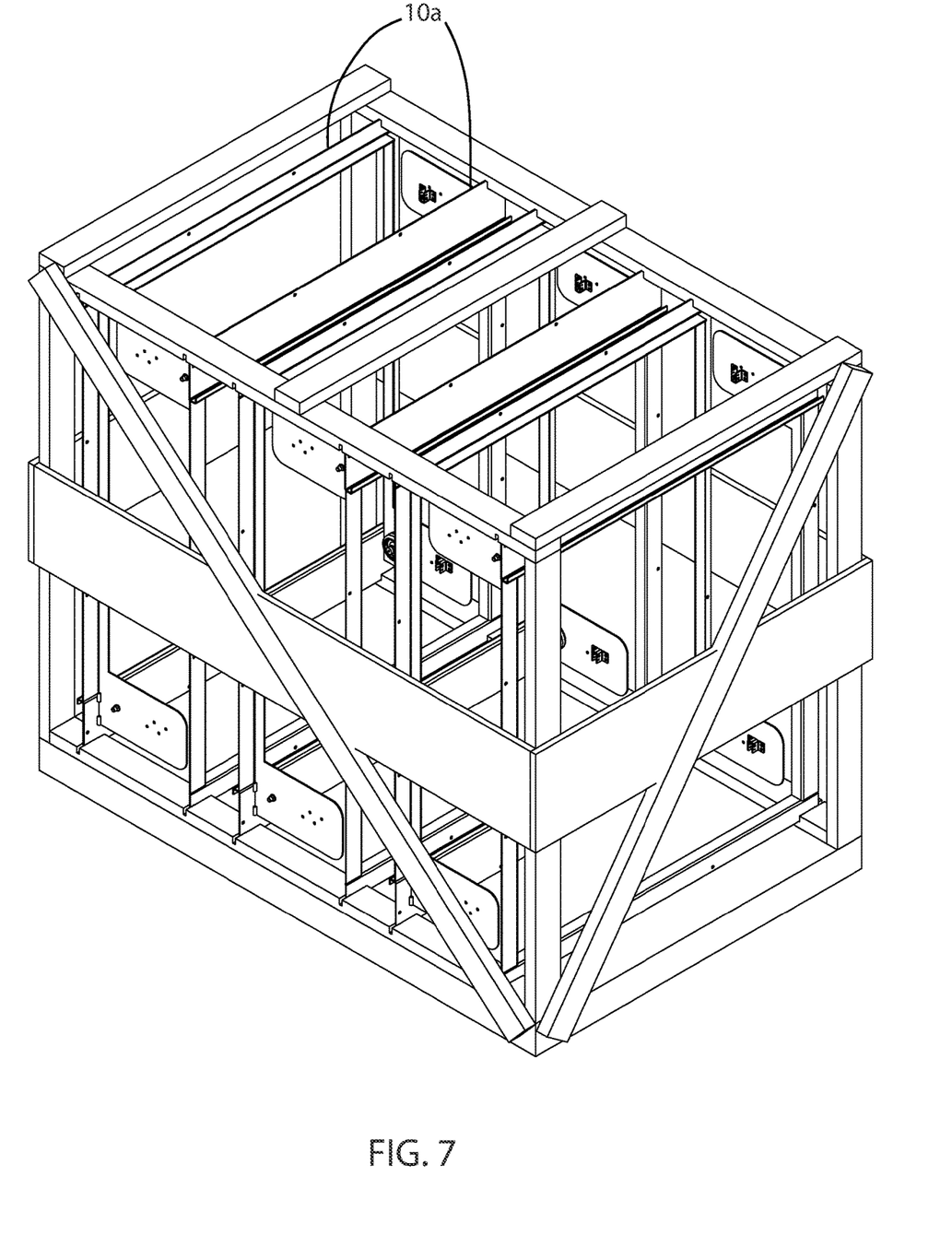
FIG. 7 is a perspective view of a crate holding a plurality of subassemblies that form the door of FIG. 1.

According to one embodiment, the subassembly 10a composed of header 16, left and right guide members 12a, 12b, and optionally sill 20 are packaged for shipment to a second geographic location, for example, a customer's facility or a vehicle body shop equipped to install doors. FIG. 7 shows a plurality of door subassemblies 10a packaged for shipment from the first geographic location to the second geographic location.

Figure 5:
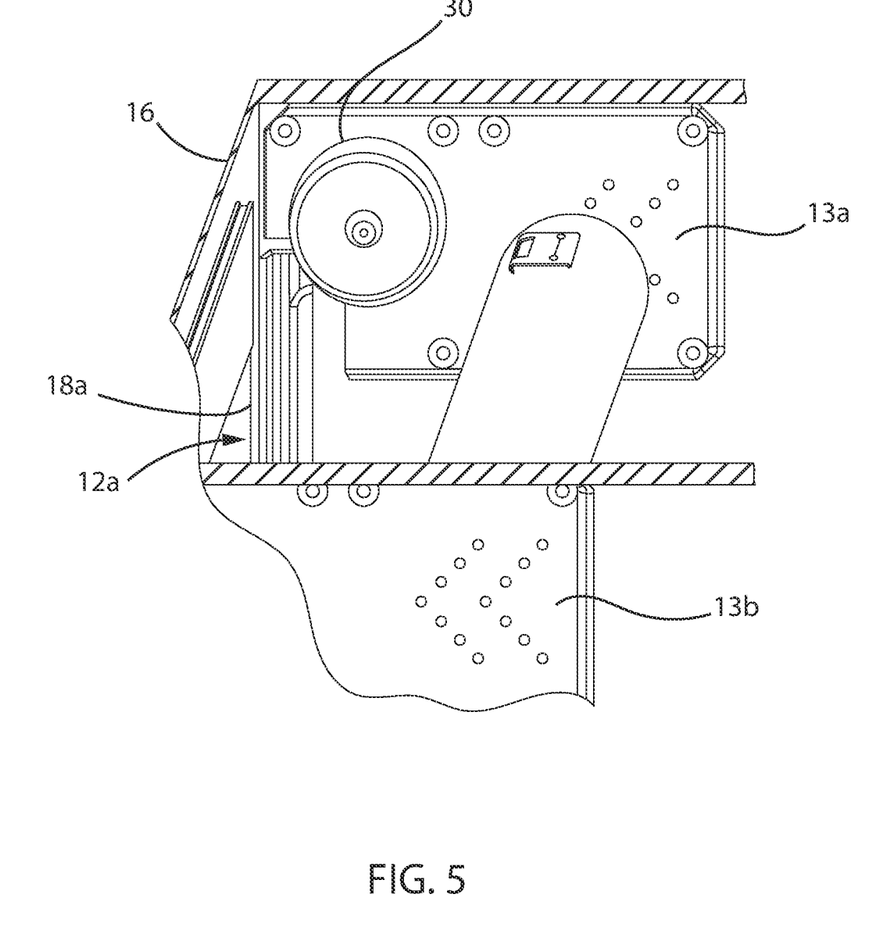
FIG. 5 is a perspective view of a portion of the door of FIG. 1 showing a roller and idler wheel.

According to another embodiment, door 10 is fully assembled before it is shipped to the second geographic location. Guide slots 18a, 18b, as shown in FIG. 1, are affixed along members 12a, 12b within the doorway as shown in FIG. 2a. As shown in FIG. 2b, idler wheels 30 are connected with extensions 13a and 13b. FIG. 5 shows a detailed perspective view of the top portion of left member 12a of a partially assembled door 10. Wheel 30 is positioned so that the tangent of the wheel toward the front of extension 13a is aligned with guide slot 18a on left member 12a. The same arrangement is provided on right extension 13b with an idler wheel having a tangent aligned with guide slot 18b on right member 12b.

Figure 6:
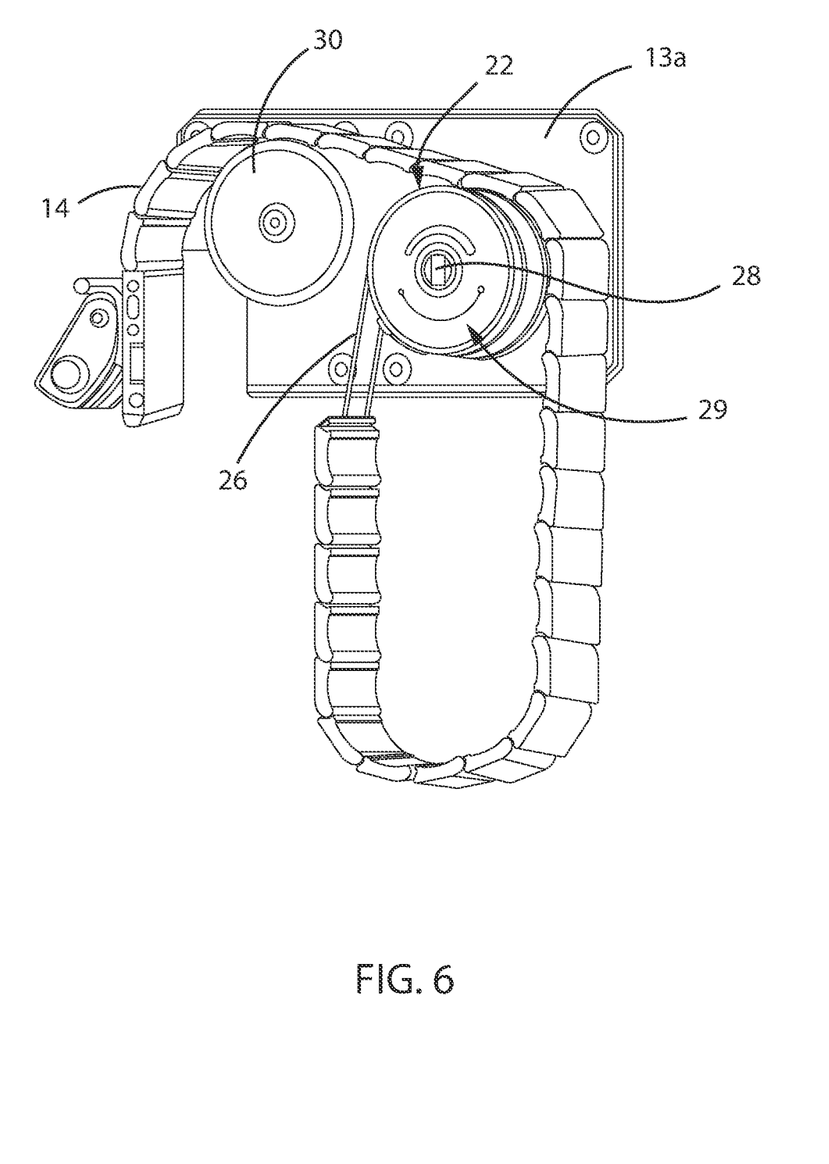
FIG. 6 is a perspective view of a portion of the door of FIG. 1 showing the installation of a door panel.

FIG. 6 shows the attachment of door panel 14 with roller 22. Connecting straps 26 connect the top edge of door panel 14 with roller 22. The left and right edges of door panel 14 pass over the idler wheels 30. The panel 14 extends along a tangent from wheel 30 downward and the edges are received in guide slots 18a and 18b.

A torsion spring mechanism in roller 22 includes a fixed axle 28 that is fixed to extensions 13a, 13b by receivers 24a, 24b so that it cannot rotate. Outer portion 29 of roller 22 is supported by receivers 24a, 24b so that it can rotate with respect to the assembly. One or more torsion springs within roller 22 connect fixed portion 28 with rotatable outer portion 29. Straps 26 connect door panel 14 with outer portion 29. The arrangement of the torsion spring in roller 22 is such that roller 22 will rotate to take up the slack in door panel 14. According to one embodiment, the torsion spring is pretensioned before it is provided to the assembly shown in FIG. 6. A removable pin locks the torsion spring in the loaded, pretensioned configuration. Once the door panel 14 has been connected with the roller 22 and properly positioned with respect to the rest of the components, the pin is removed, allowing the torsion spring to drive the roller 22 to wind the panel 14 around the roller 22.

According to one embodiment, door subassembly 10a is formed and shipped to the second geographic location as shown in FIG. 7. Door guides 18a, 18b, door panel 14, and roller 22 are added to subassembly 10a at that second geographic location. According to another embodiment, door 10 is fully assembled before the door is shipped to a second location for installation.

Figure 8A:
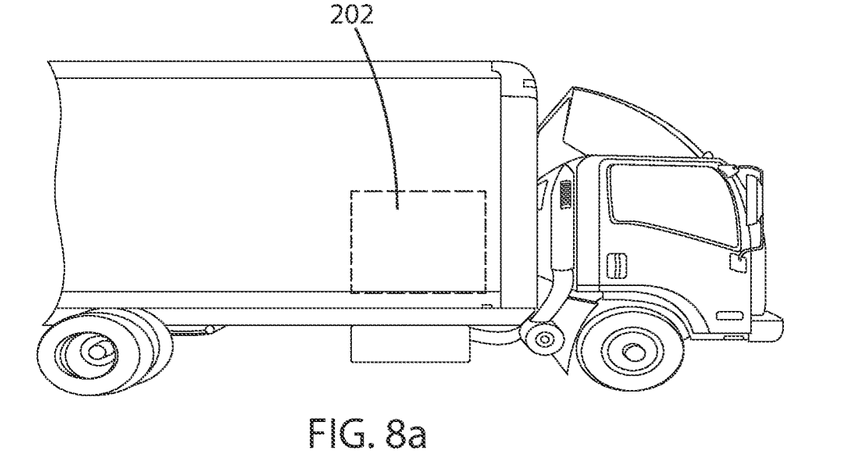
FIGS. 8a, 8b, and 8c are views of steps for installing the door of FIG. 1 through the wall of a vehicle.
Figure 8B:
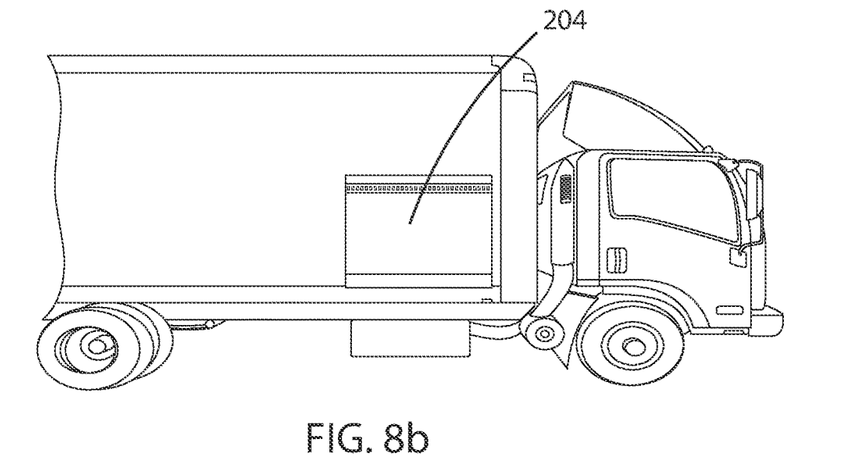
Figure 8C:
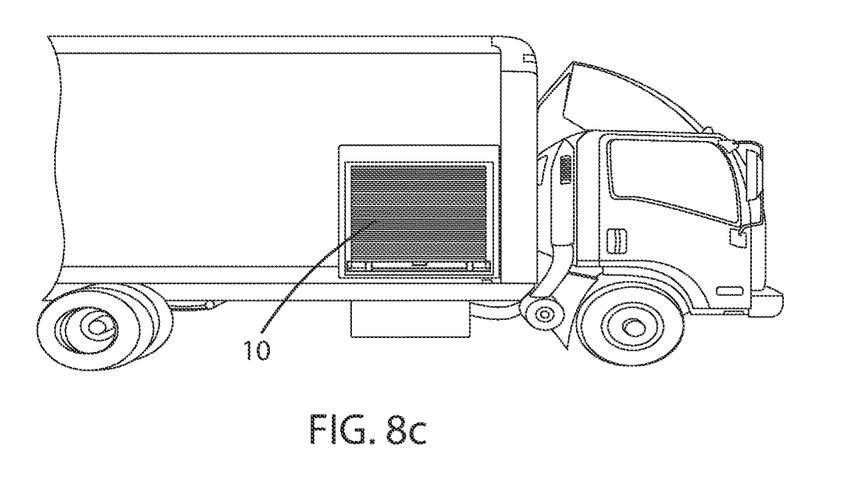

FIGS. 8a, 8b, and 8c show steps for installing door 10 in the wall of a vehicle. As shown in FIG. 8a, a location and dimension for the door is selected. According to one embodiment, door opening size is selected, for example, by the customer. The door opening size may be a standard door size, for example, 48"×60" or may be a custom size. Based on the selected door opening size, an installation size, including an installation height and installation width are calculated based on know dimensions of door 10 and a selected clearance with the edges of an installation opening. According to a preferred embodiment the installation opening is larger than the door opening by 1½ inches on the width and 4½ inches on the height.

As shown in FIG. 8b, the installation opening 204 is formed through the wall of the vehicle. As shown in FIG. 8c, door 10 is inserted into the installation opening 204. Fasteners, such as screws, rivets, or carriage bolts are provided to join the header 16, left and right flanges 11a, 11b, and bottom flange 21 to the wall of the vehicle along the periphery of opening 204. A foam seal applied to the back sides of the flanges and header provide a weather-tight connection between the door 10 and the walls of the vehicle.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

I claim:

1. A method of installing a roller door on a vehicle, the method comprising:
    forming a roller door subassembly at a first geographical location prior to connecting the subassembly with the vehicle, the step of forming comprising:
    providing a header;
    providing left and right guide members, wherein each of the guide members comprise respective left and right top portions, wherein the left guide member comprises a left flange extending leftward from the subassembly and wherein the right guide member comprises a right flange extending rightward from the subassembly, and wherein the left and right top portions comprise respective left and right roller receivers;
    connecting the guide members with the header to form the roller door subassembly as a unitary structure, wherein the guide members are substantially parallel with one another and wherein both guide members are substantially perpendicular with the header;

packaging the roller door subassembly at the first location installing the door at a second geographic location, the step of installing comprising:

creating an opening in a wall of the vehicle;

receiving the packaged roller door subassembly at the second geographic location;

unpackaging the subassembly at the second geographic location;

forming the roller door on the roller door subassembly at the second location, the step of forming comprising:

providing left and right receiving slots along vertical portions of the respective left guide member and right guide member;

providing a roller and a flexible door panel, the roller having left and right ends and being rotatable about a roller axis, wherein the door panel is connected with the roller at a top end of the door panel and wherein rotation of the roller about the axis winds and unwinds the door panel onto and off from the roller;

engaging the left and right ends of the roller with respective left and right roller receivers; and inserting left and right edges of the door panel into respective left and right receiving slots, wherein a downward force applied to the door panel causes the door panel to unwind from the roller and extend downward along the guides, inserting the roller door into the opening, wherein the left flange and the right flange contact an outer surface of the wall; and fixing the header, the left guide member, and the right guide member with the wall.

2. The method of claim 1, further comprising:

providing a sill, the sill having a left end and a right end; and arranging the sill in contact with bottom ends of the left guide member and right guide member, wherein the sill is substantially perpendicular with the left guide member and the right guide member and substantially parallel with the header; and connecting the sill with the bottom ends of the left guide member and the right guide member to form the roller door subassembly.

3. The method of claim 1, wherein the step of connecting comprises welding.

4. The method of claim 1, wherein the step of fixing comprises joining the left flange and the right flange with the wall using a plurality of fasteners.

5. The method of claim 1, wherein the step of forming further comprises applying a foam seal to back sides of the left flange and right flange, and wherein the step of inserting the roller door in the opening further comprises forming a weather-tight connection between the left and right flanges and the walls by the foam seal.

6. A method of installing a roller door on a vehicle, the method comprising:

forming a roller door subassembly at a first geographical location prior to connecting the subassembly with the vehicle, the step of forming comprising:

providing a header;

providing left and right guide members, wherein each of the guide members comprise respective left and right top portions, wherein the left guide member comprises a left flange extending leftward from the subassembly and wherein the right guide member comprises a right flange extending rightward from the subassembly, and wherein the left and right top portions comprise respective left and right roller receivers;

connecting the guide members with the header to form the roller door subassembly as a unitary structure, wherein the guide members are substantially parallel with one another and wherein both guide members are substantially perpendicular with the header;

forming the roller door on the roller door subassembly at the first location, comprising the steps of:

providing left and right receiving slots along vertical portions of the respective left guide member and right guide member;

providing a roller and flexible door panel, the roller having left and right ends and being rotatable about a roller axis, wherein the door panel is connected with the roller at a top end of the door panel and wherein rotation of the roller about the axis winds and unwinds the panel onto and off from the roller;

engaging the left and right ends of the roller with respective left and right roller receivers; and inserting left and right edges of the door panel into receiving slots of the left and right guides, wherein a downward force applied to the door panel causes the door panel to unwind from the roller and extend downward along the guides;

packaging the roller door at the first location; and installing the door at a second geographic location, the step of installing comprising:

creating an opening in a wall of the vehicle;

receiving the packaged roller door at the second geographic location;

unpackaging the roller door at the second geographic location;

inserting the roller door into the opening, wherein the left flange and the right flange contact an outer surface of the wall; and fixing the header, the left guide member, and the right guide member with the wall.

7. The method of claim 6, wherein the step of forming further comprises applying a foam seal to back sides of the left flange and right flange, and wherein the step of inserting the roller door in the opening further comprises forming a weather-tight connection between the left and right flanges and the walls by the foam seal.

* * * * *